Figure 1:
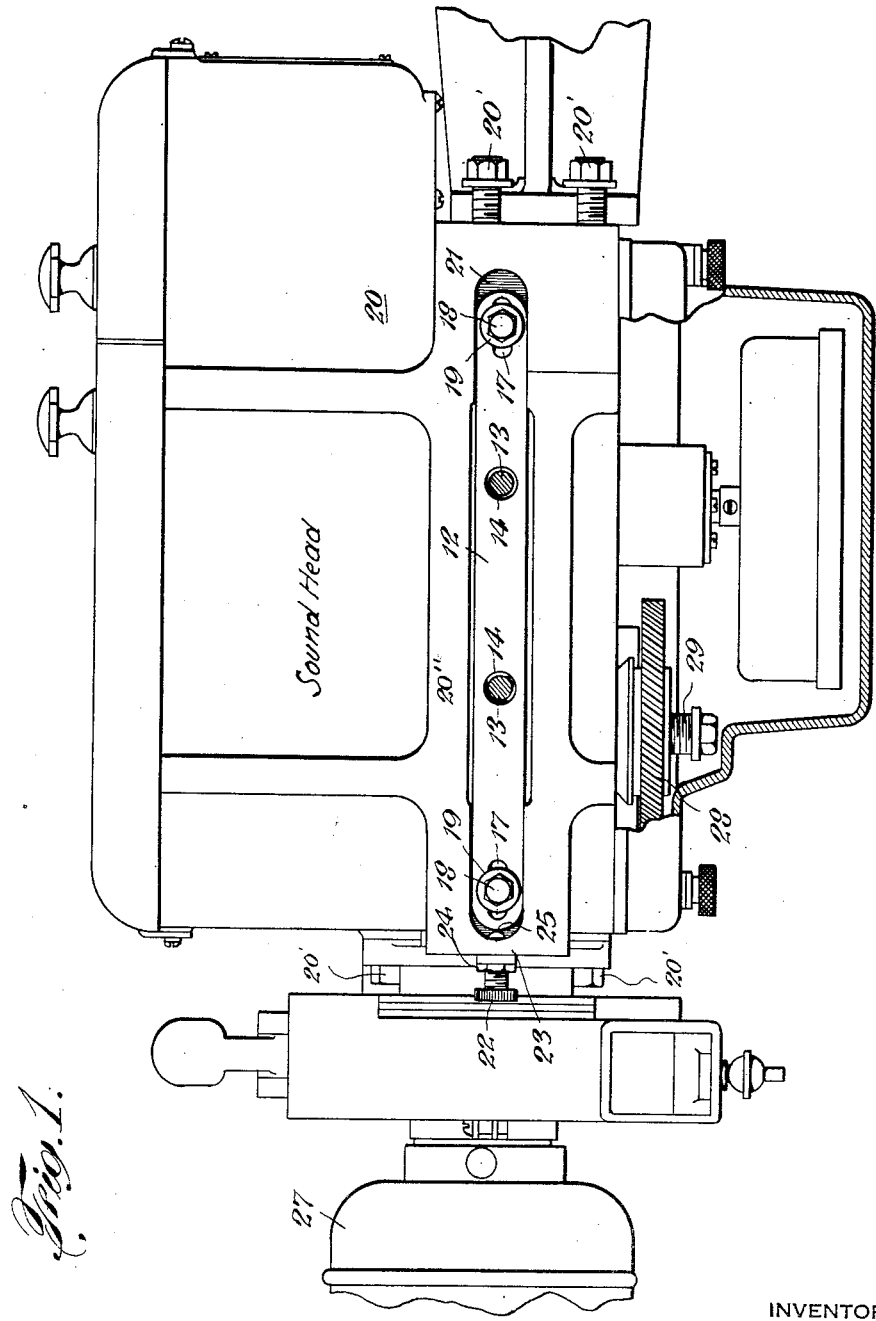

June 26, 1951

H. F. HEIDEGGER 2,558,248

MEANS FOR ADJUSTING THE SOUND AND PICTURE HEADS
OF MOTION-PICTURE PROJECTING MACHINES

Filed Aug. 17, 1948

3 Sheets-Sheet 1

INVENTOR
Henry F. Heidegger
BY
James B. Boyer
ATTORNEY

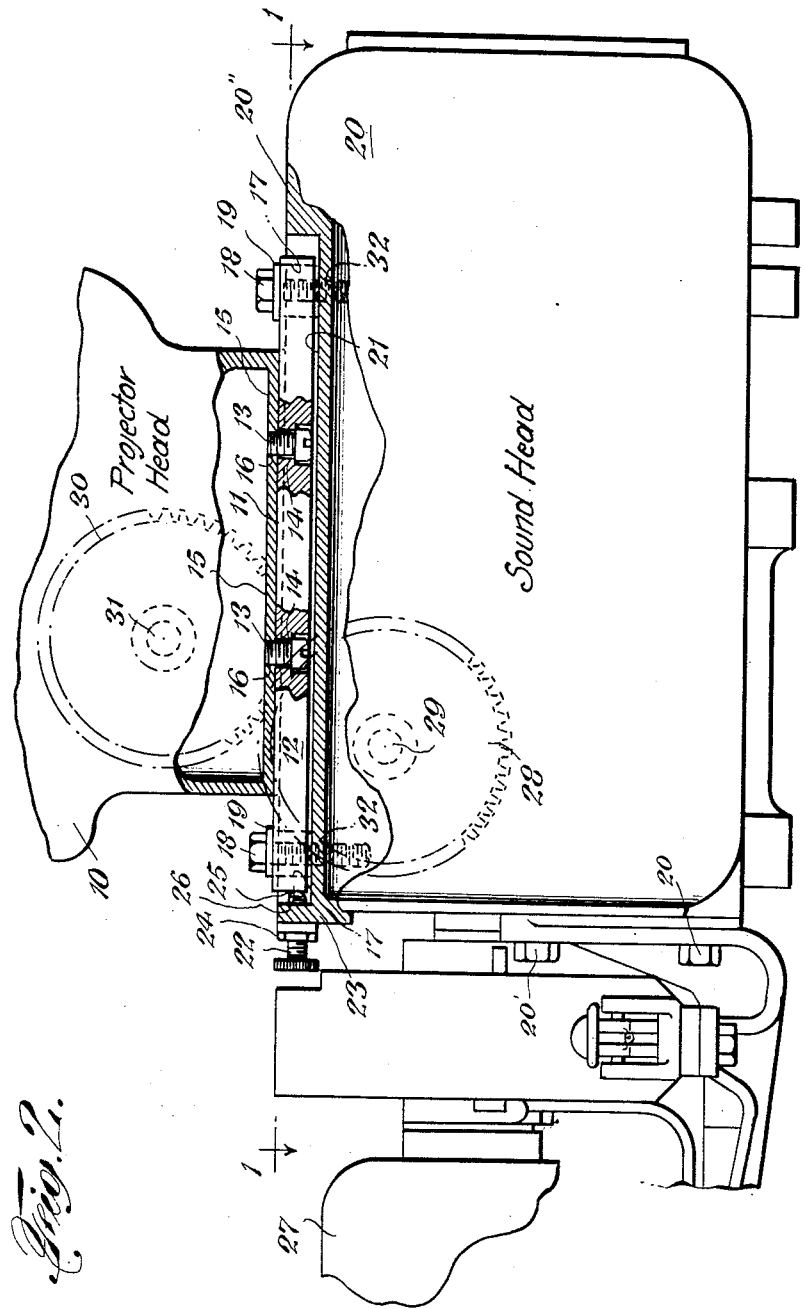

June 26, 1951             H. F. HEIDEGGER          2,558,248
MEANS FOR ADJUSTING THE SOUND AND PICTURE HEADS
OF MOTION-PICTURE PROJECTING MACHINES
Filed Aug. 17, 1948                                  3 Sheets-Sheet 3
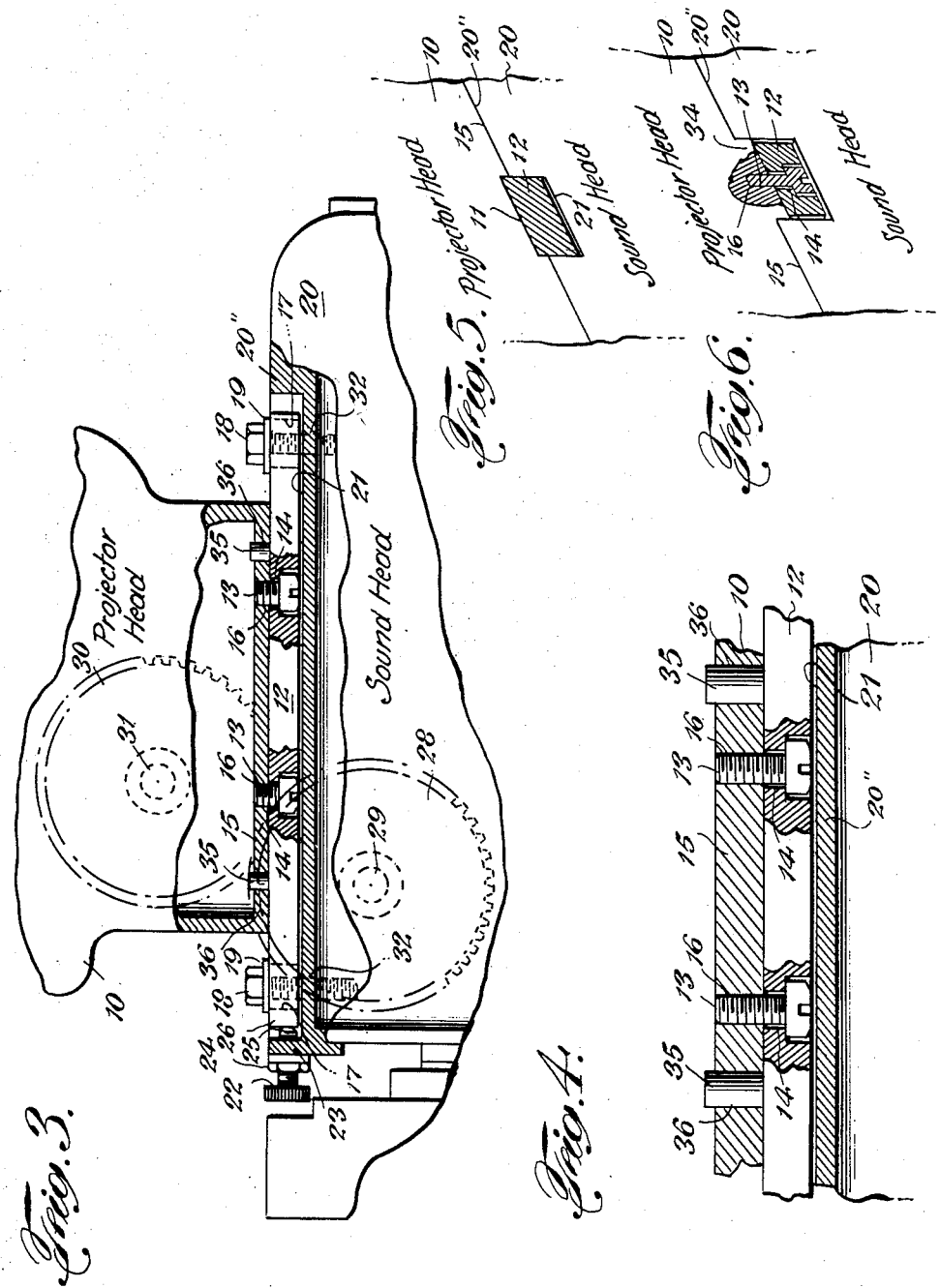
INVENTOR
Henry F. Heidegger
BY
James B. Boyer
ATTORNEY Patented June 26, 1951

2,558,248

UNITED STATES PATENT OFFICE 2,558,248

MEANS FOR ADJUSTING THE SOUND AND PICTURE HEADS OF MOTION-PICTURE PROJECTING MACHINES

Henry F. Heidegger, Glen Ridge, N. J., assignor to International Projector Corporation, Bloomfield, N. J., a corporation of Delaware Application August 17, 1948, Serial No. 44,638

5 Claims. (Cl. 88—16.2)

The present invention relates to a coupling device, more particularly designed for adjustably coupling or connecting a plurality of machine units together and thus enable the units to be located with great exactness to insure and maintain the proper relative positions thereof. The invention is especially applicable to the coupling together of motion picture projector units where a high degree of precision is required in order to so locate a projector head with relation to a sound head that moving parts in the respective units which co-act with each other shall be held in proper working adjustment, and the optical axis retained.

In motion picture projecting machines of the well-known Simplex type, the projector head is mounted upon or rests upon the table top or face of the sound head. A drive shaft passes from side to side through the sound head, the shaft having a drive gear, the periphery of which extends through an opening in the table top, to a point above the top of the sound head. A driven shaft passes transversely through the projector head in parallelism with the drive shaft, when the two units are properly assembled, the driven shaft having a driven gear to engage the drive gear.

Obviously, it is highly desirable that the projector head with its driven shaft and gear be so positioned on the table top or face of the sound head, as to effect a proper meshing or engagement of the teeth of the driven gear with the drive gear projecting through a suitable opening in the top face of the sound head.

As one means to effect such a result, reference is directed to Borberg, Patent No. 2,328,123, granted August 31, 1943, on which the present invention is an improvement.

In the said patent, an aligning bar extending fore and aft of the lower face of the base of the projector head, is fastened to said base by flat-headed screws, passing through countersunk holes formed in the aligning bar and into threaded holes in the base, to rigidly connect the aligning bar and base plate against any relative movement.

In said patent, the height of the bar is equal to the depth of the "slot" or elongated recess formed in the table top of the sound head in which the bar seats, so that the projector head rests on and is actually supported by the upper edge of the bar as well as by the top of the sound box or head.

When extreme accuracy is used in the machining of the bar and its reception slot, so that the upper edge of the bar lies flush with the upper face of the top plate of the sound head, the base of the projector head is afforded a broad support and cannot tip sidewise or slue in a horizontal plane.

But such accuracy of workmanship adds materially to the cost of manufacture, both in time and labor. Hence, it could happen that the slot would not be milled to the proper depth or that the bar might be higher than it should be, so that the upper edge of the bar would extend a few thousandths above the plane of the top plate. Also, dirt, filings and other extraneous material might be left in the slot. In such event, the projector head will be supported at an angle to the horizontal, or wholly on the upper edge of the bar, in either of which instances, the projector head will tip sidewise or slue under lateral pressure, as far as permitted by the lateral clearance afforded the bar in the slot.

This undesired shifting of the projector head and bar relatively to the sound head, operates to displace the driven shaft mounted in the projector head relatively to the drive shaft mounted in the sound head so that the shafts are out of parallelism, cocking or skewing the driven gear relatively to its drive gear.

This results in objectionable noise in the operation of the machine, and in erratic film feeding. If the film has a sound track, discordant and abnormal sound reproduction might also result.

Furthermore, the optical axis is displaced so that proper projection of the picture images on the screen is not obtained.

In addition, in the patented structure, the bevelled, flat heads of the screws fastening the bar to the lower face of the base of the projector head, when screwed tightly, set up a wedging action tending to displace or distort the bar.

Furthermore, it was found in practice, that an excessive amount of time, care and attention as well as extreme precision workmanship was required to properly machine the aligning bar to exact dimensions and to mill the slot to the proper depth, after which the threaded holes in the aligning bar had to be so located that they would exactly register with the corresponding threaded holes in the base of the projector head, and when the aligning bar was then secured in place, there was no provision for effecting adjustments of the bar relatively to the projector head to compensate for slight inaccuracies in workmanship of the parts.

One of the principal objects of the present invention is to improve the means disclosed in the above-mentioned patent and thus avoid the foregoing disadvantages.

To this end, I have contrived means which enable the operator to adjust the aligning bar to proper position relatively to the projector head so that extreme precision in forming the holes in the bar and in the projector head base is no longer necessary.

Also I have improved the means for securing the bar to the projector head more rigidly so as to prevent relative movement after the adjustments have been made, and in such a manner as to eliminate the lateral sluing and rocking of the projector head and aligning bar relatively to the sound head.

In the accompanying drawings, illustrating my invention, and forming a part of this application:

Fig. 1 is a top plan view, partly broken away, of a sound head unit, taken on the line 1—1 of Fig. 2, showing the aligning bar or key seated in the channel formed in the top face of the sound head, Fig. 2 is a side view, partly in section, showing the projector head fixed or coupled to the sound head, Fig. 3 is a side view which shows a modified form wherein the aligning bar or coupler is equipped with a pair of dowel pins to engage the base of the projector head, Fig. 4 is an enlarged detail view of the modified form shown in Fig. 3, Fig. 5 is a fragmentary diagrammatic perspective view showing the relation of the aligning bar in respect to the sound head and the projector head, shown in Fig. 2; and Fig. 6 is a fragmentary diagrammatic perspective view showing a modified arrangement of the aligning bar in respect to the sound head and the projector head.

Referring to Fig. 2, a motor 27 at the front of a motion picture projector, is connected in any suitable manner (not shown) with a drive shaft 29 extending transversely of a sound head casing 20 fastened to the projector machine frame, as by the bolts 20', 20', Fig. 1. A gear 28 is fastened on the drive shaft 29, the gear being of such diameter as to project to a point above the upper face of the top wall 20'' of the sound head.

A projector head is indicated at 10, Fig. 2, the flat base 15 of which rests upon the upper flat face of the top wall or table 20'' of the sound head. A driven shaft 31 projects transversely across the projector head 10, a driven gear 30 being fast on the driven shaft.

The sound head and projector head are separate units, and it is very necessary, in motion picture projecting machines, to so locate the projector head unit on the sound head unit that the drive and driven shafts shall be in parallelism, with the drive and driven gears in proper mesh and to retain the projector head securely in its adjusted position on the sound head, against lateral rocking and sluing. My invention is particularly designed to attain this result.

To this end, the bottom face of the base 15 of the projector head is provided with a groove 11 (Fig. 5) extending at right angles to the driven shaft 31, and from front to rear of the projector head, the groove being located a predetermined distance from the driven gear wheel 30.

An aligning bar or key 12 is snugly accommodated in the groove 11, and counter-bored clearance holes 14 drilled through the aligning bar from top to bottom to correspond and register with tapped or threaded holes 16 in the groove 11 in the base of the projector head, accommodate threaded fastening means 13, to secure the aligning bar firmly in place in the groove 11 for the prevention of relative movement between the projector head and the aligning bar.

The holes 14 are slightly larger in diameter than the diameters of the threaded fastening means and of the tapped holes 16 in the base of the projector, to afford clearance permitting some slight adjustment of the aligning bar 12 backwardly or forwardly in the groove 11 for the purpose of aligning the clearance holes 14 with the tapped holes 16.

The lower ends of the clearance holes 14 are each counter-bored to entirely accommodate the heads of the threaded fastening means 13, which, conveniently, may be fillister-headed screws, the shoulders of which squarely abut against the square shoulders of the counter-bores when the screws are tightened, to press the aligning bar against the closed top of the groove without a wedging action.

The thickened top or table 20'' of the sound head 20 is milled out to form an elongated recess or channel 21, closed at its ends and extending fore and aft of the sound head. This channel is located at a predetermined distance from the drive gear 28 to correspond with the spacing between the driven gear 30 and the groove 11 in the base of the projector head. The channel is somewhat longer than the coupling or aligning bar and the depth of the channel may correspond substantially with the height of the aligning bar 12, but because the aligning bar is seated in the groove 11, the lower face of the aligning bar clears or is spaced above the bottom of the channel to insure that the flat, unmutilated portion or area of the lower face of the projector head base shall fully contact and rest upon the flat upper face of the sound head, as shown in Figs. 2 to 5.

As shown in the above-mentioned Patent No. 2,328,123, the opposite ends of the aligning bar extend past the vertical planes of the front and rear ends of the projector head, respectively, the projecting ends of the bar having slots 17 formed therethrough from top to bottom to accommodate bolts 18 passing through their respective slots and threaded into holes 32 tapped into the bottom of the channel 21, to provide means for securing the aligning bar and projector head to the sound head.

In assembling the projector head 10 on the sound head 20, the aligning bar 12 is first placed in its groove 11 on the lower face of the projector base 15 and adjusted lengthwise in the groove until the clearance holes 14 in the aligning bar register with the tapped holes in the base 15, whereupon the fillister-headed screws 13 are inserted in place and tightened or set, the fillister heads lying wholly within the counter-bored lower ends of the clearance holes, with the shoulders of the fillister heads pressing squarely against the counter-bored shoulders of their clearance holes to maintain a firm holding contact.

The projector with its aligning bar is then placed on top of the sound head, with the aligning bar inserted in the channel 21 in the upper face 20'' of the sound head, after which the projector 10 with its aligning bar 12 is slid forwardly or rearwardly until the slots 17 in the projecting ends of the aligning bar register with the tapped holes 32 in the bottom of the channel 21, whereupon the bolts 18 are thrust through the slots 17 and turned down in the threaded holes 32 to lightly hold the aligning bar and projector in place.

The width of the aligning bar in the form of my invention shown in Fig. 2, is such as to fit snugly in the channel 21 so that it may be slid with slight resistance, there being a clearance left between the bottom of the aligning bar 12 and the bottom of the channel 21, as above explained.

Since the slots 17 in the projecting ends of the aligning bar 12 permit a relatively large extent of movement of the projector head on the sound head, it may be that when the slots 17 of the bar register with the holes 32 in the channel 21, in one position of the projector head on the sound head, the driven gear 30 is too fully in mesh, with its drive gear 28, to remedy which, an adjusting screw 22 having a knurled head is threaded through the front end wall 23 of the sound projector, in line with the front end 26 of the aligning bar 12, so that the rear end 25 of the adjusting screw may contact the front end of the aligning bar. A lock nut 24 on the threaded portion of the adjusting screw may be turned to contact the outer face of the end wall 23 of the channel 21 and lock the screw 22 after the desired adjustment is effected. By loosening the lock nut, the adjusting screw may be turned to force the aligning bar 12 and projector head rearwardly until the proper mesh between the drive and driven gears 28 and 30 is obtained, after which the lock nut 24 is tightened and the bolts 18 are set to maintain such adjustment, the heads of the bolts pressing against washers 19 overlying the slots 17 in the ends of the aligning bar, to afford a firm even contact.

Should the driven gear 30 be out of engagement with its drive gear 28, the projector head and its aligning bar are slid forwardly, and the proper meshing engagement obtained, in the manner above explained.

From the foregoing, it is seen that the sidewalls of the groove or aligning bar seat 11 on the lower face of the projector head base 15, prevent any lateral play of the bar relatively to the projector head after the threaded fastenings 13 have been set.

It will also be noted that the slight clearance (exaggerated in the drawings) between the fastening means 13 and the clearance holes 14 permits sufficient adjustability of the aligning bar 12 relatively to the projector head 10, to enable the clearance holes to be registered with their corresponding tapped holes 16 in the projector base 15 to accommodate the fastening means, thus compensating for slight inaccuracies in machining these parts.

And finally, by arranging that the lower edge of the aligning bar 12 shall clear the bottom of the channel 21, full contact of the unmutilated area of the lower face of the projector head base with the top face of the sound head 20 is assured, so that the projector head will have a stable contact with the sound head and be supported thereby against rocking laterally, the bolts 18 which secure the aligning bar to the top plate 20'' of the sound head, in combination with the sidewalls of the channel 21, preventing sluing of the projector head and aligning bar relatively to the sound head.

A convenient means to provide the clearance between the lower edge of the aligning bar and the bottom of the channel is to form the aligning bar of substantially the same height as the depth of the channel, and cut the groove 11 in the bottom face of the projector base 15 to a depth equal to the amount of clearance desired between the lower edge of the bar and the bottom of the channel. The position of the aligning bar 12 relatively to the groove 11 in the projector base and the channel 21 in the sound head is illustrated in the diagrammatic view, Fig. 5.

A modified form of coupling for connecting the projector to the sound head is illustrated in diagram in Fig. 6, wherein the base 15 of the projector, in place of the groove 11, is provided with a rib 34 depending from the lower face of the projector base 15 and of such width as to snugly fit within the channel 21 formed in the upper face of the top plate 20'' of the sound head.

In this form, the aligning bar 12 is of less height and width than the bar shown in Fig. 2, to avoid the necessity of exactly machining the bar, as well as to preserve a clearance between the lower face of the bar and the bottom of the channel, the bar being secured to the lower face of the rib 34, in the manner shown in Fig. 2. The projecting ends of this modified bar are identical with the bar of Fig. 2, and similarly secured by bolts to the bottom of the channel 21.

Since the rib 34 extends only from front to rear of the projector head base, it is desirable to provide the coupling bar 12, the ends of which extend beyond the front and rear faces of the projector head, to accommodate the means 18 for securing the bar to the bottom of the channel.

The advantages obtained by the form of construction shown in Fig. 2, are retained in the modified structure shown in Fig. 6.

A second modification is shown in Figs. 3 and 4. In this form, unlike that shown in Fig. 2, the bottom face of the base 15 of the projector head 10 is not grooved, the aligning bar or key 12, being of less height than the aligning bar of Fig. 2. The bar or key is secured in a predetermined position to the flat ungrooved bottom face of the base 15 of the projector head by fastening means, such as shown in Fig. 2, and fits snugly in a channel 21 formed in the top of the sound head casing, as in Fig. 2. Bolts 18 passing through slots 17 in the extended ends of the bar and threaded in tapped holes 32 in the bottom of the channel 21, as in Fig. 2, hold the bar in its adjusted position.

As an equivalent or substitute for the seating groove 11 of Fig. 2, to afford a firm, solid, unyielding connection between the aligning bar or key 12 and the projector head 10, and to reinforce the threaded fastenings 13, I provide the dowel pins or studs 35 (Fig. 3) projecting upwardly from the upper edge of the bar and spaced at a considerable distance apart. These studs or pins enter holes 36 drilled into the base 15 of the projector head in register with the pins, and into which the pins snugly fit.

The dowel pin connection of the aligning bar or key with the projector head, however, necessitates a little more accuracy in machining to insure the correct positioning of the dowel pin holes relatively to the dowel pins, and to the tapped holes 16 for the fillister-headed screws 13.

In this modified form, the clearance holes 14 in the aligning bar or key are of a diameter sufficiently large to enable the fastening means 13 to screw into the tapped holes 16 in the base of the projector head, even when the clearance holes and tapped holes are not truly centered.

Changes may be made in the form and arrangement of the parts described, and also it will be understood that the invention may be applied to other machines where it is desired to accurately couple individual units against relative movement, without departing from the scope of the claims.

What I claim as new is:

1. The combination with a relatively stationary member, and a second member adjustable relatively thereto having a base and being separable from the relatively stationary member; a drive shaft mounted in one of said members; a driven shaft mounted in the other of said members; and gears mounted on the respective shafts and capable of intermeshing when the members are correctly assembled with their respective shafts in parallelism; of means to connect the members against separation or relative movement, to maintain the shafts in parallelism and the gears meshed, including a key coupling bar; the base of the relatively movable member having a groove extending in its direction of adjustment, the key coupling bar seating in, and being embraced by, the groove; the relatively stationary member having a channel formed therein longer than the key coupling bar, and into which channel the coupling bar extends, leaving a clearance between the lower face of the coupling bar and the bottom of the channel; the relatively movable member being adjustable relatively to said stationary member within the range provided by the coupling bar and channel; and means to secure the bar to the respective members, to maintain such adjustment, and to fasten the members together.

2. In a motion picture projecting machine, the combination with a sound head, a projector head having a base removably attachable to the sound head; a drive shaft extending transversely of the sound head; a driven shaft extending transversely of the projector head; and gears on the respective shafts; of means to secure the projector head to the sound head to maintain the respective shafts in parallelism and the gears in proper mesh, including a coupling bar extending beyond the front and rear faces of the projector head, the base of the projector head having a groove extending lengthwise of the base in the direction of adjustment of the projector head relatively to the sound head to properly mesh the drive and driven gears, and in predetermined relation with the gear on the driven shaft, the upper edge of the coupling bar being seated in the groove; the projector head having spaced threaded holes in the groove; the coupling bar having counter-bored clearance holes slightly larger in diameter than the threaded holes and spaced correspondingly; headed fastening means passing loosely through the clearance holes and screwed into the threaded holes; the top of the sound head having a channel located apart from the gear on its drive shaft a distance corresponding to the distance between the groove in the projector head and its adjacent gear; the coupling bar being accommodated in, and fitting snugly against the sidewalls of, the channel to retain the projector head aligned with the sound head; and means to adjustably secure the coupling bar to the sound head.

3. The combination in a motion picture image producing machine, with a sound head and a picture producing head having abutting faces; of means to secure the heads together against relative movement, including a co-acting key coupling bar, and groove elements, respectively, in the picture producing head and in the sound head; and fastening means passing through the key coupling bar and into the bases of the respective grooves in said heads to rigidly secure the bar to the respective heads to prevent sluing movement of one head relatively to the other.

4. In a motion picture producing machine, the combination with a sound head and a picture producing head having abutting faces, the heads being relatively separable, inter-related precision mechanism carried by the respective heads, and requiring a nicety of relative adjustment of the heads to effect and maintain their proper inter-relation, the abutting faces of the respective heads each being provided with an elongated recess-like groove which grooves are brought into register, the groove in the sound head being of greater length than the groove in the picture producing head; a key coupling bar of greater height than the depth of the groove in the picture producing head, said key coupling bar being securely seated in the groove in the picture producing head and extending in opposite directions past the ends of its groove, the key coupling bar being of less length than the recess in the sound head into which the projecting portion of the key coupling bar fits; and means to firmly secure the key coupling bar against movement in its groove in the sound head, and to adjustably secure the key bar in place in the groove in the sound head.

5. The combination comprising a relatively stationary member, and a second member adjustable relatively thereto having a base and being separable from the relatively stationary member; a drive shaft mounted in one of said members; a driven shaft mounted in the other of said members; gears mounted on the respective shafts and capable of properly intermeshing when the members are correctly assembled with their respective shafts in proper alignment; means to connect the members against separation or relative movement, to maintain the shafts in proper alignment and the gears properly meshed, including a key coupling bar; the base of the relatively movable member having a groove extending in its direction of adjustment, the key coupling bar seating in and being embraced by the groove; the relatively stationary member having a channel formed therein longer than the key coupling bar, and into which channel the coupling bar extends; the relatively movable member being adjustable relatively to said stationary member within the range provided by the coupling bar and channel; and means to secure the bar to the respective members, to maintain such adjustment, and to fasten the members together.

HENRY F. HEIDEGGER.

REFERENCES CITED

The following references are of record in the file of this patent:

UNITED STATES PATENTS

| Number | Name | Date |
|---|---|---|
| 2,240,323 | Zimmerman | Apr. 29, 1941 |
| 2,328,123 | Borberg | Aug. 31, 1943 |